UNITED STATES PATENT OFFICE.

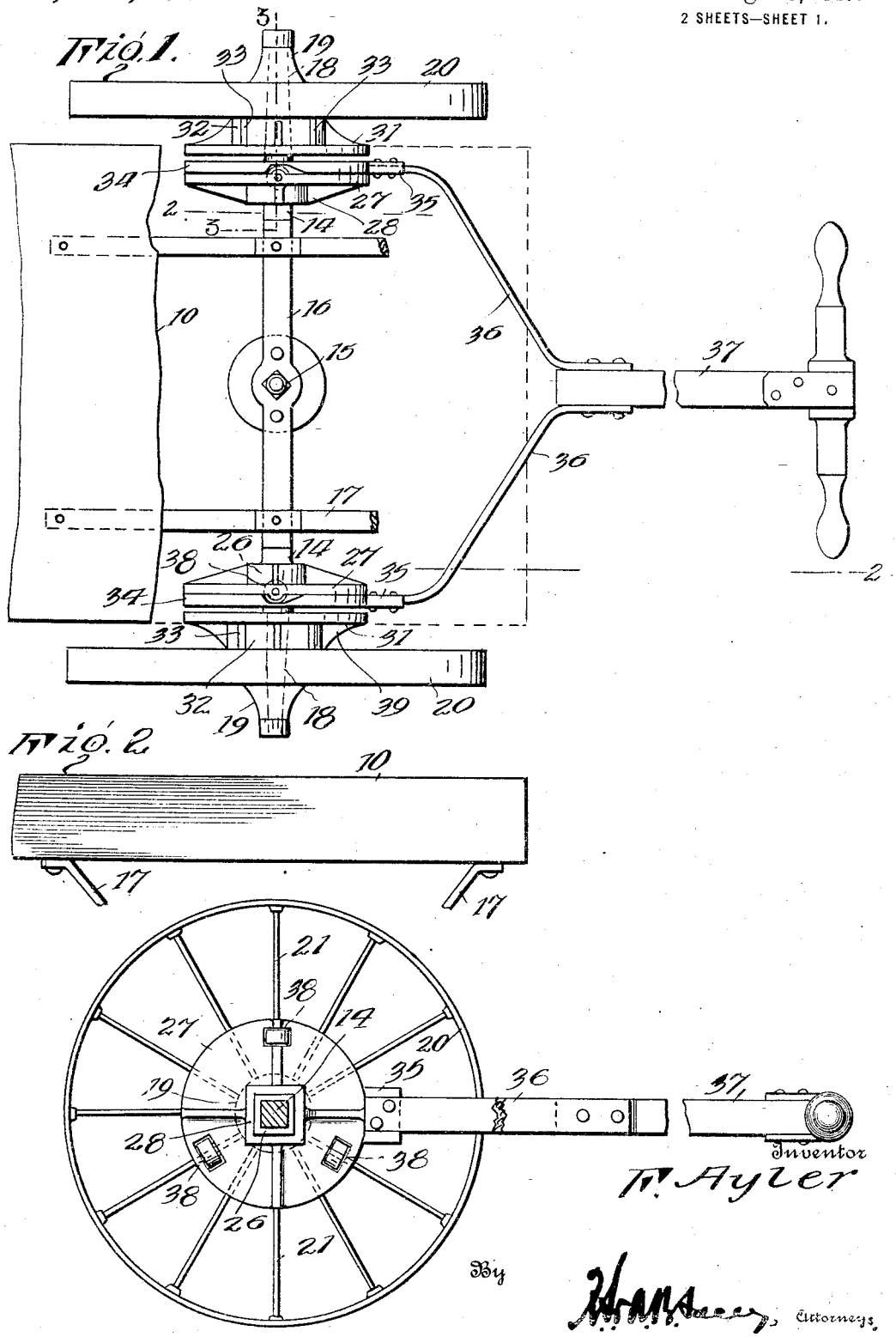

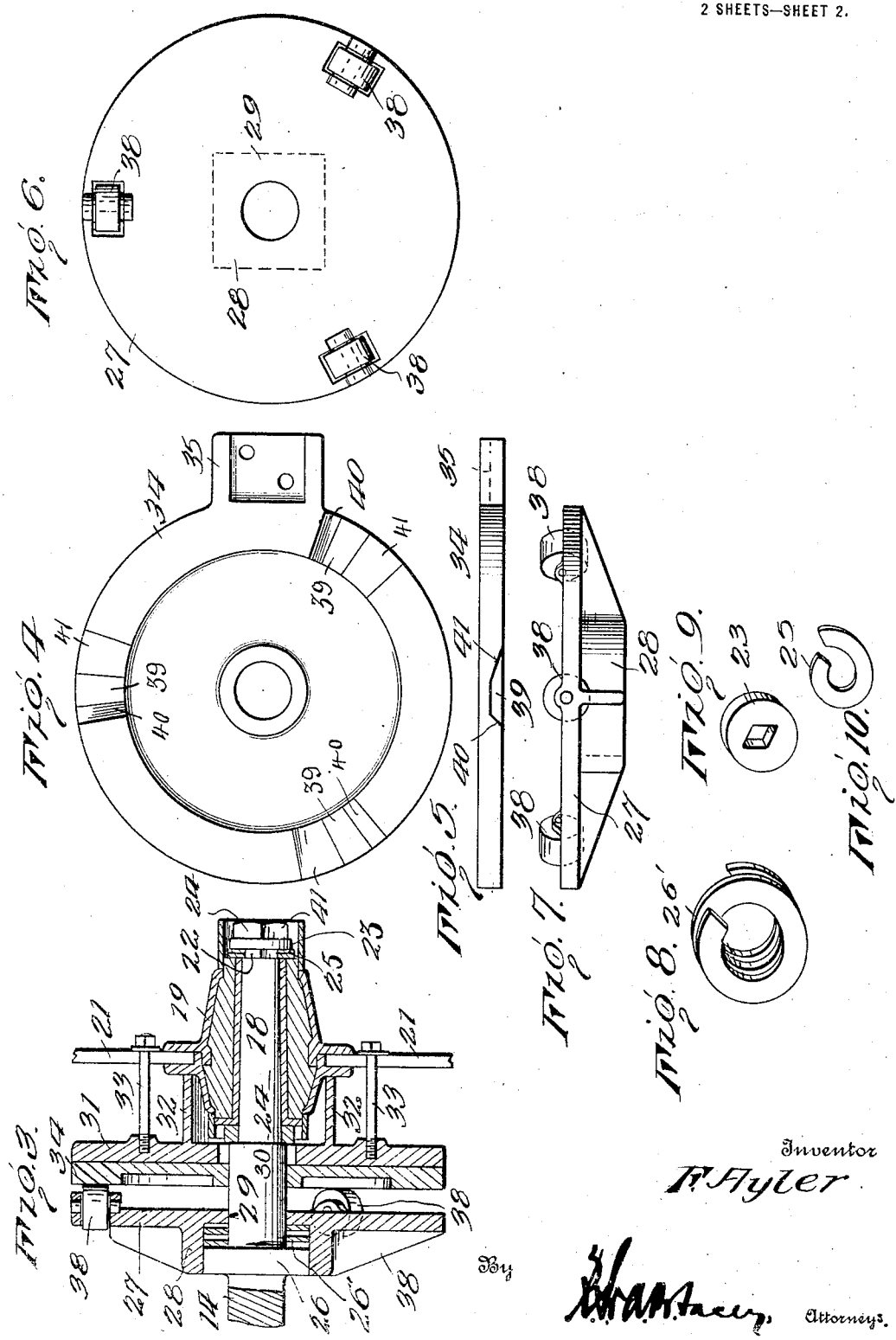

FRANK AYLER, OF WINONA, WASHINGTON.

VEHICLE-BRAKE.

1,238,377.  Specification of Letters Patent.  Patented Aug. 28, 1917.

Application filed January 6, 1917. Serial No. 141,003.

*To all whom it may concern:*

Be it known that I, FRANK AYLER, a citizen of the United States, residing at Winona, in the county of Whitman and State of Washington, have invented certain new and useful Improvements in Vehicle-Brakes, of which the following is a specification.

This invention relates to vehicle brakes, more particularly to brakes employed in connection with hand actuated vehicles, such as the baggage and express trucks employed at railway stations and the like, and has for one of its objects to provide a brake device which is held in inoperative position when the draft tongue or pulling handle is maintained in operative position, and which will be automatically applied when the pulling handle or tongue is disposed in its lower position, with its outer end in contact with the floor or ground, or elevated into an abnormally high position. Thus while the operator is moving the truck over the ground under normal conditions the brake will be held in unapplied or inoperative position, but when the movement of the vehicle is stopped and the operator drops the handle to the ground, the brake will be automatically applied. If on the other hand the operator desires to apply the brake without releasing his grip upon the handle, he simply elevates the latter into an abnormal position.

The improved device may be applied to various forms of vehicles, but as before stated, is more particularly applicable to the freight or baggage trucks employed by railway companies, express and transportation companies, and the like, and for the purpose of illustration the improved device is shown applied to a hand operated freight truck, and in the drawings, Figure 1 is a plan view of the forward portion of a truck with the improvement applied, a portion of the truck platform being broken away.

Fig. 2 is a side elevation of the parts shown in Fig. 1, with the forward axle in section on the line 2—2 of Fig. 1.

Fig. 3 is an enlarged sectional view on the line 3—3 of Fig. 1.

Fig. 4 is a side view of the intermediate friction disk.

Fig. 5 is a plan view of the member shown in Fig. 4.

Fig. 6 is a side view of the axle supported disk.

Fig. 7 is a plan view of the disk shown in Fig. 6.

Fig. 8 is a detached perspective view of the pressure applying spring.

Fig. 9 is a detached perspective view of the axle journal washer.

Fig. 10 is a detached perspective view of the axle journal tension spring.

Corresponding and like parts are referred to in the following description and indicated in all the views of the drawings by the same reference characters.

A truck employed for illustrating the operation of the device comprises a platform, a portion of which is shown at 10, a forward axle, represented at 14, pivotally united at 15 to a bolster device 16, the latter being suitably braced from the platform, as represented at 17. The forward axle is held from turning, and is provided at its ends with journals 18 upon which the hubs 19 of the forward wheels are mounted for rotation. The rims of the forward wheels are represented at 20 and the spokes at 21. One of the journals 18 of the forward axle is represented more fully in Fig. 3, and is formed with a square portion 22 between its threaded terminal and the body of the journal. Fitting upon the square portion 22 of the journal is a washer 23 having a square aperture to fit over the square portion of the journal, the washer thus being held from turning. The holding nut is represented at 24, and disposed between the nut and the washer 23 is a spring washer 25, the object to be hereafter explained.

The axle 14 is provided with a square or otherwise than round stop collar, represented at 26, and engaging the axle in advance of the stop collar is a circular disk or plate 27 having a socket or sleeve 28 extending from one face with its interior square or corresponding to the outer face of the collar and engaging over the same. The member 27 is formed with a central opening 29 to movably engage around a parallel sided bearing portion 30 of the axle. The member 27 is thus movable longitudinally of the axle but is held from turning thereon by the coaction of the squared collar 26 and the squared interior face of the sleeve or socket 28.

A relatively stiff or strong spring, represented at 26′ is preferably disposed in the socket 28 between the body of the disk 27 and the stop collar 26. Another stop collar 24 is preferably disposed around the journal 18 at its juncture with the bearing portion 30, to receive the inward thrust of the hub 19.

Each end of the forward axle is provided with the squared portion 26 and bearing 30 and the stop washer and spring washer, but only one set is shown for illustration, the ends of the axles being precisely alike except that the parts are arranged rights and lefts.

Connected to the inner face of each forward wheel is a friction plate, represented as a whole at 31, and rigidly connected in any suitable manner to the wheel.

For the purpose of illustration the plate 31 is provided with a stop collar or integral sleeve 32 which extends to and engages against the spokes 20, while the member 31 is coupled to the spokes by a plurality of clamp bolts 33. Mounted for rotation upon each of the bearing portions 30 of the axle is a friction plate or disk 34, each disk having a projection or socket member 35 to receive the braces or "hound" portions 36 which support the pulling handle, represented at 37. By this means when the handle member is moved vertically the member 34 will be correspondingly rotated upon the bearings 30. Mounted for rotation in the plate 27, preferably near the margin, are bearing rollers 38, and formed in the confronting face of the member 34 are depressions 39 to receive the rollers 38 when the member 34 is disposed in a certain position. The rollers 38 and the depressions 39 will be so disposed that when the handle 37 is in substantially level position, the rollers will be seated within the depressions 39 and permit the member 34 to move into relatively close proximity to the member 27 and thus be correspondingly moved away from the member 31. When thus disposed the forward wheels are left free to rotate upon the forward axle journals, but when the handle member is moved either upwardly of downwardly into an abnormal position, for instance with its forward end in contact with the ground or floor, or its outer end elevated above its normal pulling position, the member 34 will be rotated to a sufficient extent to cause the depressions 39 to move past the rollers 38 and cause the latter to engage with the solid portions of the member 34 between the depressions, and thus move the member 34 into engagement with the member 31, and couple the rigid member 27 to the member 31 and operate as a brake to the forward wheels.

By this arrangement so long as the operator is moving the vehicle under normal conditions, or with the pulling handle or tongue substantially in level position, the brake device is held in inoperative position, but if the operator drops the handle to the floor or ground or elevates the handle above its normal operative position, the brake will be automatically applied. Thus at the end of the trip the brake is applied by simply releasing the handle or tongue, or the brake as readily applied at any intermediate point in the trip of the vehicle by simply elevating the handle.

The ends of the depressions 39 are beveled, as shown more clearly in Fig. 5, one of the beveled ends being relatively short, as shown at 40, and the other beveled end being relatively long, as shown at 41. The shorter beveled ends of the depressions engage with the rollers 38 when the handle is dropped to the floor, and thus quickly applies the brake, while the longer beveled ends 41 engage the rollers 38 when the handle is elevated.

By providing the beveled portions 41 relatively long the brake may be gradually applied, thus when running down grade it may be desirable to simply check the progress of the car and apply the brake only to a limited extent, and this can be done, as will be obvious, by moving the handle slowly into its upper or abnormal position. The force of the friction exerted by the brake device may thus be readily controlled by simply manipulating the pulling handle.

The improved device is simple in construction, can be inexpensively manufactured and applied without material structural change in the truck, and a very slight change in the construction of the forward axle.

Having thus described the invention, what is claimed as new is—

1. In a vehicle, an axle including a journal formed with a stop collar, a parallel portion and reduced portion with a stop shoulder between the reduced and the parallel portions, an inner member movable on the parallel portion of the journal and having a sleeve engaging over the stop collar, an intermediate member rotative on the parallel portion of the journal and provided with a friction face, said inner and intermediate members having coacting bearing rollers and alternating sockets and bearing faces, and an outer member adapted to be attached to the adjacent wheel of a vehicle and having a friction face coacting with the friction face of the intermediate member.

2. In a vehicle, an axle held from rotation and including a journal adapted to support a bearing wheel and having a stop collar of other form than round, an inner member having a laterally directed sleeve with its interior corresponding to and engaging over the stop collar and coupled thereby to the axle, an outer member adapted to be connected to rotate with the wheel, an intermediate member rotative relatively to the axle, a pulling member carried by the intermediate member, and means whereby the outer and inner members are coupled to the intermediate member when the pulling member is moved into an abnormal position.

3. In a vehicle, an axle including a journal adapted to support a bearing wheel and having a stop collar of other form than round, an inner member having a socket to receive the stop collar and coupled thereby to the axle, a spring between the stop collar and the inner member, an outer member connected to rotate with the wheel, an intermediate member rotative relatively to the axle, and means whereby the outer and inner members are coupled to the intermediate member when the pulling member is moved into an abnormal position.

4. In a vehicle including an axle and a bearing wheel rotative thereon an outer member fast to the wheel and having a friction element, an inner member fast to the axle, an intermediate member rotative relatively to the wheel and axle and having a friction element coacting with the friction element of the outer member, said inner and intermediate members having coacting rollers and depressions, a pulling member carried by the intermediate friction member, said rollers being so located as to enter the depressions when the pulling member is disposed in normal or operative position and to engage the undepressed portion when the pulling member is disposed in an abnormal or inoperative position, to cause the intermediate member to be engaged with the outer friction member.

In testimony whereof I affix my signature.

FRANK AYLER. [L. S.]

Copies of this patent may be obtained for five cents each, by addressing the "Commissioner of Patents, Washington, D. C."